(12) United States Patent
Seewig (10) Patent No.: US 9,562,756 B2
(45) Date of Patent: Feb. 7, 2017

(54) MEASURING DEVICE WITH CALIBRATION

(71) Applicant: JENOPTIK Industrial Metrology Germany GmbH, Villingen-Schwenningen (DE)

(72) Inventor: Jörg Seewig, Hannover (DE)

(73) Assignee: JENOPTIK Industrial Metrology Germany GmbH, Villingen-Schwenningen (DE)

( * ) Notice: Subject to any disclaimer, the term of this patent is extended or adjusted under 35 U.S.C. 154(b) by 427 days.

(21) Appl. No.: 14/032,571

(22) Filed: Sep. 20, 2013

(65) Prior Publication Data
US 2014/0083162 A1    Mar. 27, 2014

(30) Foreign Application Priority Data
Sep. 20, 2012  (DE) .................. 10 2012 018 580

(51) Int. Cl.
G01B 3/30       (2006.01)
G01B 5/10       (2006.01)
(Continued)

(52) U.S. Cl.
CPC . *G01B 5/10* (2013.01); *B24B 5/42* (2013.01); *B24B 49/045* (2013.01); *G01B 5/08* (2013.01); *G01B 5/201* (2013.01)

(58) Field of Classification Search
CPC .......... B24B 5/42; B24B 49/04; B24B 49/045; B24B 49/10; B24B 9/148; B24B 47/225; G01B 5/0002; G01B 5/08; G01B 5/201; G01B 5/213; G01M 11/0264
(Continued)

(56) References Cited

U.S. PATENT DOCUMENTS 1,425,283 A    8/1922  Pratt
1,557,903 A   10/1925  Tornberg
(Continued)

FOREIGN PATENT DOCUMENTS

CH    660 629 A5   5/1987
DE        88446    3/1972
(Continued)

OTHER PUBLICATIONS

U.S. Appl. No. 12/662,813, filed May 2010, Keller et al.
(Continued)

*Primary Examiner* — Lisa Caputo
*Assistant Examiner* — Nashmiya Fayyaz
(74) *Attorney, Agent, or Firm* — Shlesinger, Arkwright & Garvey LLP (57) ABSTRACT

A measuring device for in-process measurement of test pieces during a machining operation on a machine tool, in particular a grinding machine, has a base body, and a measuring head movable between a neutral position and a measuring position and which is connected to the base body via a rod assembly which is configured and set up in such a way that the measuring head in the measuring position follows orbital rotations of a test piece about a rotational axis. The measuring head has a measuring sensor which is deflectable along a linear axis for recording measured values during a measuring operation. A control apparatus is provided for controlling the measuring operation. The control apparatus is configured and set up in such a way that the measuring device may be calibrated in a calibration mode.

13 Claims, 9 Drawing Sheets

(51) Int. Cl.
   *B24B 5/42* (2006.01)
   *G01B 5/08* (2006.01)
   *G01B 5/20* (2006.01)
   *B24B 49/04* (2006.01)

(58) Field of Classification Search
   USPC .......................................................... 73/1.79
   See application file for complete search history.

(56) References Cited

U.S. PATENT DOCUMENTS

| | | | |
|---|---|---|---|
| 1,815,049 | A | 7/1931 | Cole |
| 1,892,005 | A | 12/1932 | Richmond |
| 1,947,456 | A | 1/1934 | Arnold et al. |
| 2,408,672 | A | 10/1946 | Mennesson |
| 2,603,043 | A | 7/1952 | Bontemps |
| 2,789,354 | A | 4/1957 | Polidor at al. |
| 2,909,873 | A | 4/1957 | Fisk |
| 2,949,708 | A | 8/1960 | Butterworth et al. |
| 3,157,971 | A | 11/1964 | Snyder |
| 3,274,693 | A | 9/1966 | Witzke |
| 3,321,869 | A | 5/1967 | Parrella et al. |
| 3,352,022 | A | 11/1967 | Fisk |
| 3,352,065 | A | 11/1967 | Enkelmann |
| 3,386,178 | A | 6/1968 | Arnold et al. |
| 3,552,820 | A | 1/1971 | Brachvogel |
| 3,603,044 | A | 9/1971 | Price |
| 3,648,377 | A | 3/1972 | Witzke |
| 3,663,190 | A | 5/1972 | Fisk |
| 3,688,411 | A | 9/1972 | Asano et al. |
| 3,694,970 | A | 10/1972 | Schoonover et al. |
| 3,777,441 | A | 12/1973 | Kurimoto et al. |
| 3,793,775 | A | 2/1974 | Ishikawa et al. |
| 3,802,087 | A | 4/1974 | Raiteri |
| 3,863,352 | A | 2/1975 | Peonski |
| 3,987,552 | A | 10/1976 | Raiteri |
| 4,106,241 | A | 8/1978 | Fisk |
| 4,141,149 | A | 2/1979 | George et al. |
| 4,175,462 | A | 11/1979 | Simon |
| 4,351,115 | A | 9/1982 | Possati |
| 4,394,683 | A | 7/1983 | Liptay-Wagner et al. |
| 4,414,748 | A | 11/1983 | Gauler et al. |
| 4,429,464 | A | 2/1984 | Burrus |
| 4,437,239 | A | 3/1984 | Possati |
| 4,480,412 | A | 11/1984 | Shank et al. |
| 4,485,593 | A | 12/1984 | Munzing et al. |
| 4,493,168 | A * | 1/1985 | Field, Jr. ............... B24B 13/00 33/507 |
| 4,524,546 | A | 6/1985 | Hoover et al. |
| 4,566,763 | A | 1/1986 | Greguss |
| 4,596,076 | A | 6/1986 | Sigg |
| 4,606,130 | A | 8/1986 | Vetter |
| 4,625,413 | A | 12/1986 | Possati et al. |
| 4,637,144 | A | 1/1987 | Schemel |
| 4,651,438 | A | 3/1987 | Hutter et al. |
| 4,679,331 | A | 7/1987 | Koontz |
| 4,807,400 | A | 2/1989 | Corallo et al. |
| 4,819,195 | A | 4/1989 | Bell et al. |
| 4,903,413 | A | 2/1990 | Bellwood |
| 4,958,442 | A | 9/1990 | Eckhardt |
| 4,986,004 | A | 1/1991 | Hartmann et al. |
| 5,021,650 | A | 6/1991 | Rieder et al. |
| 5,054,205 | A | 10/1991 | Danielli |
| 5,058,325 | A | 10/1991 | Pineau |
| 5,077,908 | A | 1/1992 | Moore |
| 5,086,569 | A | 2/1992 | Possati et al. |
| 5,088,207 | A | 2/1992 | Betsill et al. |
| 5,095,634 | A | 3/1992 | Overlach et al. |
| 5,097,602 | A | 3/1992 | Cross et al. |
| 5,099,585 | A | 3/1992 | Liskow |
| 5,123,173 | A | 6/1992 | Possati |
| 5,136,527 | A | 8/1992 | Koretz |
| 5,150,545 | A | 9/1992 | Esteve |
| 5,337,485 | A | 8/1994 | Chien |
| 5,419,056 | A | 5/1995 | Breitenstein |
| 5,473,474 | A | 12/1995 | Powell |
| 5,479,096 | A | 12/1995 | Szczyrbak et al. |
| 5,542,188 | A | 8/1996 | Ertl et al. |
| 5,551,814 | A | 9/1996 | Hazama |
| 5,551,906 | A | 9/1996 | Helgren |
| 5,625,561 | A | 4/1997 | Kato et al. |
| 5,758,431 | A | 6/1998 | Golinelli |
| 5,761,821 | A | 6/1998 | Laycock |
| 5,771,599 | A | 6/1998 | Uchimura et al. |
| 5,902,925 | A | 5/1999 | Crispie et al. |
| 5,914,593 | A | 6/1999 | Arms et al. |
| 5,919,081 | A | 7/1999 | Hykes et al. |
| 5,956,659 | A | 9/1999 | Spies et al. |
| 5,982,501 | A | 11/1999 | Benz et al. |
| 6,029,363 | A | 2/2000 | Masreliez et al. |
| 6,062,948 | A | 5/2000 | Schiff et al. |
| 6,067,720 | A | 5/2000 | Heilbronner |
| 6,067,721 | A | 5/2000 | Dall'Aglio et al. |
| 6,088,924 | A | 7/2000 | Esteve |
| 6,116,269 | A | 9/2000 | Maxson |
| 6,159,074 | A | 12/2000 | Kube et al. |
| 6,167,634 | B1 | 1/2001 | Pahk et al. |
| 6,205,371 | B1 | 3/2001 | Wolter-Doll |
| 6,256,898 | B1 | 7/2001 | Trionfetti |
| 6,266,570 | B1 | 7/2001 | Hocherl et al. |
| 6,298,571 | B1 | 10/2001 | Dall'Aglio et al. |
| 6,304,827 | B1 | 10/2001 | Biixhavn et al. |
| 6,321,171 | B1 | 11/2001 | Baker |
| 6,415,200 | B1 | 7/2002 | Kato et al. |
| 6,430,832 | B1 | 8/2002 | Dall'Aglio et al. |
| 6,487,787 | B1 | 12/2002 | Nahum et al. |
| 6,487,896 | B1 | 12/2002 | Dall'Aglio |
| 6,490,912 | B1 | 12/2002 | Volk ............................ 73/104 |
| 6,511,364 | B2 | 1/2003 | Ido et al. |
| 6,560,890 | B1 | 5/2003 | Madge et al. |
| 6,568,096 | B1 | 5/2003 | Svitkin et al. |
| 6,643,943 | B2 | 11/2003 | Dall'Aglio et al. |
| 6,711,829 | B2 | 3/2004 | Sano et al. |
| 6,763,720 | B1 | 7/2004 | Jacobsen et al. ............... 73/602 |
| 6,783,617 | B2 | 8/2004 | Lorenzen |
| 6,848,190 | B2 | 2/2005 | Dall'Aglio et al. |
| 6,931,749 | B2 | 8/2005 | Dall'Aglio |
| 6,952,884 | B2 | 10/2005 | Danielli |
| 6,955,583 | B2 | 10/2005 | Dall'Aglio et al. |
| 7,020,974 | B2 | 4/2006 | Danielli et al. |
| 7,024,785 | B2 | 4/2006 | Dall'Aglio et al. |
| 7,047,658 | B2 | 5/2006 | Danielli et al. |
| 7,607,239 | B2 | 10/2009 | Dall'Aglio et al. |
| 7,665,222 | B2 | 2/2010 | Dall'Aglio et al. |
| 7,690,127 | B2 | 4/2010 | Dall'Aglio et al. |
| 7,954,253 | B2 | 6/2011 | Dall'Aglio et al. |
| 8,286,361 | B2 | 10/2012 | Dall'Aglio et al. |
| 8,336,224 | B2 | 12/2012 | Arnold |
| 8,429,829 | B2 | 4/2013 | Arnold |
| 8,508,743 | B2 | 8/2013 | Keller |
| 8,667,700 | B2 | 3/2014 | Dall'Aglio et al. |
| 9,393,663 | B2 | 7/2016 | Volk |
| 2002/0020075 | A1 | 2/2002 | Dall'Aglio et al. |
| 2002/0066179 | A1 | 6/2002 | Hall et al. |
| 2002/0155790 | A1 | 10/2002 | Ido et al. |
| 2002/0166252 | A1 | 11/2002 | Dall'Aglio et al. |
| 2003/0009895 | A1 | 1/2003 | Dall'Aglio ................ 33/555.3 |
| 2003/0056386 | A1 | 3/2003 | Danielli et al. ............ 33/555.1 |
| 2004/0045181 | A1 | 3/2004 | Dall'Aglio et al. |
| 2004/0055172 | A1 | 3/2004 | Danielli |
| 2004/0137824 | A1 | 7/2004 | Dall'Aglio ..................... 451/8 |
| 2004/0200085 | A1* | 10/2004 | Sakata .................. G01B 7/282 33/550 |
| 2005/0178018 | A1 | 8/2005 | Dall'Aglio et al. |
| 2005/0217130 | A1 | 10/2005 | Danielli et al. |
| 2007/0039196 | A1 | 2/2007 | Dall'Aglio et al. |
| 2008/0155848 | A1 | 7/2008 | Dall'Aglio et al. |
| 2008/0211436 | A1 | 9/2008 | Dietz et al. ................... 318/135 |
| 2009/0113736 | A1 | 5/2009 | Dall'Aglio et al. |
| 2010/0292946 | A1* | 11/2010 | Tamai .................. G01B 21/042 702/94 |
| 2011/0001984 | A1 | 1/2011 | Keller et al. |
| 2011/0010124 | A1 | 1/2011 | Wegmann |
| 2011/0119943 | A1 | 5/2011 | Arnold |

(56) References Cited

U.S. PATENT DOCUMENTS

| | | |
|---|---|---|
| 2011/0232117 A1 | 9/2011 | Arnold |
| 2011/0283784 A1 | 11/2011 | Seewig |
| 2012/0043961 A1 | 2/2012 | Volk |
| 2012/0224180 A1 | 9/2012 | Keller et al. |

FOREIGN PATENT DOCUMENTS

| | | |
|---|---|---|
| DE | 32 32 904 C2 | 3/1984 |
| DE | 43 20 845 C1 | 10/1994 |
| DE | 441965 | 1/1995 |
| DE | 4419656 | 1/1995 |
| DE | 44 12 682 A1 | 10/1995 |
| DE | 4412652 | 10/1995 |
| DE | 4412682 | 10/1995 |
| DE | 44 16 493 A1 | 11/1995 |
| DE | 297 22 951 U1 | 4/1998 |
| DE | 100 18 107 A1 | 10/2001 |
| DE | 695 21 921 T2 | 4/2002 |
| DE | 69619857 T2 | 11/2002 |
| DE | 202 14 856 U1 | 2/2003 |
| DE | 698 09 667 T2 | 4/2003 |
| DE | 102 05 212 A1 | 8/2003 |
| DE | 601 01 792 T2 | 10/2004 |
| DE | 600 15 654 T2 | 8/2005 |
| DE | 10 2007 031 358 A | 3/2009 |
| DE | 10 2008 016 228 | 10/2009 |
| DE | 10 2010 013 069 A1 | 9/2011 |
| EP | 0 068 082 A2 | 1/1983 |
| EP | 0105627 | 4/1984 |
| EP | 0 322 120 | 6/1989 |
| EP | 0 322 120 A2 | 6/1989 |
| EP | 0 382 336 A2 | 8/1990 |
| EP | 0 469 439 A1 | 2/1992 |
| EP | 0 471 180 A2 | 2/1992 |
| EP | 0 480 222 A2 | 4/1992 |
| EP | 0 810 057 A1 | 12/1997 |
| EP | 0 810 067 A1 | 12/1997 |
| EP | 0 859 689 | 8/1998 |
| EP | 0859689 A | 8/1998 |
| EP | 0 866 945 B1 | 9/1998 |
| EP | 0 878 704 A1 | 11/1998 |
| EP | 0 903 199 A2 | 3/1999 |
| EP | 1 063 052 A2 | 12/2000 |
| EP | 1 063 052 B1 | 12/2000 |
| EP | 1 118 833 | 7/2001 |
| EP | 1 263 517 | 12/2002 |
| EP | 1 263 547 | 12/2002 |
| EP | 1 263 547 B1 | 12/2002 |
| EP | 1 321 793 B1 | 6/2003 |
| EP | 1 370 391 | 12/2003 |
| EP | 1 370 391 B1 | 12/2003 |
| EP | 1370391 A | 12/2003 |
| EP | 1 263 547 B1 | 12/2007 |
| FR | 756177 | 9/1933 |
| GB | 405 817 | 2/1934 |
| GB | 136275 | 7/1974 |
| GB | 1362996 | 8/1974 |
| GB | 2086778 A | 5/1982 |
| GB | 2 161 101 A | 1/1986 |
| GB | 2 197 477 A | 5/1988 |
| GB | 2 300 582 A | 11/1996 |
| JP | 53-4285 A | 1/1978 |
| JP | 55120976 | 9/1980 |
| JP | 55-156801 | 12/1980 |
| JP | 59-93844 U | 6/1984 |
| JP | 59125001 | 7/1984 |
| JP | 3-66553 A | 3/1991 |
| JP | 10-118974 A | 5/1998 |
| JP | 11-513317 A | 11/1999 |
| WO | WO 83/04302 | 12/1983 |
| WO | WO 90/00246 | 1/1990 |
| WO | WO 92/14120 | 8/1992 |
| WO | WO 94/17361 | 8/1994 |
| WO | WO 97/12724 | 4/1997 |
| WO | WO 97/13614 | 4/1997 |
| WO | WO-A-9712724 | 4/1997 |
| WO | WO 97/40434 | 10/1997 |
| WO | WO 99/47884 | 9/1999 |
| WO | WO 01/58565 | 8/2001 |
| WO | WO 01/66305 A1 | 9/2001 |
| WO | WO 01/66306 | 9/2001 |
| WO | WO 02/070195 | 9/2002 |
| WO | WO 02/090047 A1 | 11/2002 |
| WO | 2004/023256 A2 | 3/2004 |
| WO | WO 2009/003692 A1 | 1/2009 |

OTHER PUBLICATIONS

U.S. Appl. No. 12/805,053, filed Jul. 2010, Wegmann.
U.S. Appl. No. 12/923,412, filed Sep. 2010, Arnold.
U.S. Appl. No. 13/041,196, filed Mar. 2011, Keller et al.
U.S. Appl. No. 13/096,375, filed Apr. 2011, Seewig.
U.S. Appl. No. 13/073,625, filed Mar. 2011, Arnold.
Office Action, dated Jan. 12, 2016 in counterpart Chinese patent application 201310424817.7 (16 pages).
Office Action, dated Sep. 28, 2015 in counterpart Japanese patent application 2013-192646 (2 pages).
Portion of Marposs Catalogue (circa 1970).
Leaflet—Fenar Marposs (1991).
"Crankshaft Gauing Machines," Hommelwerke (1985).
European Patent Office First Office Action dated Dec. 9, 2014 re parallel European Application 13/004469.6-1702—JENOPTIC Industrial Metrology Germany GmbH—(3 pgs).
German Patent Office First Office Action received Sep. 6, 2013 re parallel DE Patent Appl. No. 10 2012 018 580.4—JENOPTIK Industrial Metrology Germany GmbH (3pgs).

\* cited by examiner

MEASURING DEVICE WITH CALIBRATION

CROSS-REFERENCE TO RELATED APPLICATION

This application claims the priority of German application no. 10 2012 018 580.4, filed Sep. 20, 2012, and which is incorporated herein by reference.

FIELD OF THE INVENTION

The invention relates to a measuring device for in-process measurement of test pieces during a machining operation on a machine tool, in particular a grinding machine.

BACKGROUND OF THE INVENTION

In the manufacture of crankshafts it is necessary to grind the crank pins of the crankshaft to size on a grinding machine. To ensure that the grinding operation is terminated as soon as a desired dimension is reached, the crank pin must be continuously checked during the machining operation, in particular with regard to its diameter and roundness, within the scope of an in-process measuring operation. EP-A-0859689 discloses such a measuring device.

A measuring device is known from EP-A-1370391 which is used for in-process measurement of crank pins during a grinding operation on a grinding machine. The known measuring device has a measuring head which is connected via a rod assembly to a base body of the measuring device so as to be pivotable about a first pivot axis. The known measuring device also has a means for swiveling the measuring head in and out of a measuring position. For carrying out an in-process measurement on a crank pin, the measuring head is swiveled by the means provided for this purpose into a measuring position in which the measuring head, for example by means of a measuring prism, comes to rest on the crank pin to be measured. The crank pin undergoes an orbital rotation about the rotational axis of the crankshaft during the grinding operation. In this manner, the grinding wheel remains in contact with the crank pin, and for this purpose is movably supported radially with respect to the rotational axis of the crankshaft. To ensure that measurements may be carried out on the crank pin during the entire grinding operation, the measuring head follows the movements of the crank pin. For this purpose, the base body of the measuring device is connected to a base body of the grinding machine, so that during the grinding operation the measuring device is moved synchronously with the grinding wheel of the grinding machine in the radial direction of the crankshaft. Similar measuring devices are also known from DE 2009/052254 A1 and DE 2010 013 069 A1.

A measuring device of the type in question for in-process measurement of test pieces during a machining operation on a machine tool is known from EP 1 263 547 B1, having a base body, and a measuring head which is movable between a neutral position and a measuring position and which is connected to the base body via a rod assembly which is designed and set up in such a way that the measuring head in the measuring position follows orbital rotations of the test piece about a rotational axis, the measuring head having a measuring sensor which is deflectable along a linear axis for recording measured values during a measuring operation. The measuring device known from the cited publication also has a control apparatus for controlling the measuring operation, the measuring device being provided for measuring the diameter and roundness of crank pins of a crankshaft during a machining operation on a grinding machine.

OBJECTS AND SUMMARY OF THE INVENTION

An object of the invention is to provide a measuring device for in-process measurement of test pieces during a machining operation on a machine tool, in particular a grinding machine which is improved with regard to its measuring accuracy and reliability.

This object is achieved by the invention as set forth herein.

In a known measuring device, measured values are recorded during a rotation of the test piece (a crank pin, for example) relative to the measuring head, on the basis of which the component contour is reconstructed by computation. The reconstruction may be carried out by means of an iterative process, as is known from DE 2009 032 353 A1. However, the reconstruction may also be carried out on the basis of a Fourier analysis, as is known from EP 1 263 517 B1. Regardless of the particular reconstruction method used, the geometric relationships of the measuring device, for example and in particular with regard to the shape of a measuring prism of the measuring head and the configuration of the measuring head relative to the test piece, are used in the reconstruction. In the known measuring device and the known method for operating such a measuring device, the geometric relationships of the measuring device are considered to be given by the accuracy of the component tolerances used.

The invention is based on the finding that the measuring accuracy of the measuring device is sensitive to deviations of the actual geometric relationships from the recorded geometric relationships. On this basis, the invention is based on the concept of taking into account such deviations of the geometric relationships, which may result from component tolerances as well as from wear of the components of the measuring device, in the evaluation and reconstruction.

For this purpose, the invention provides that the control apparatus is configured and set up in such a way that the measuring device may be calibrated in a calibration mode. Thus, according to the invention the geometric relationships of the measuring device are no longer regarded as given; rather, the actual geometric relationships are taken into account in the evaluation and reconstruction of the component contour by calibration of the measuring device. Since the measuring accuracy is sensitive to deviations of the assumed geometric relationships from the actual geometric relationships, and may result in measuring errors, according to the invention the measuring accuracy of the measuring device according to the invention is increased.

In the calibration carried out according to the invention, not only are deviations from the desired geometry of the measuring device that are caused by component tolerances, but also deviations resulting from wear are taken into account. This is therefore of great importance, in particular due to the fact that in these types of measuring devices, for example a measuring prism of the measuring head touches down on the test piece with significant force during the movement from the neutral position into the measuring position, so that wear is inevitable. In addition, deviations from the desired geometry which result from altered kinematics of the rod assembly, which connects the measuring head to the base body, due to wear are detected via the calibration according to the invention, and thus are no longer able to impair the measuring accuracy. According to the invention, the calibration may be carried out at predetermined time intervals, or after measurement of a predetermined number of test pieces. However, according to the invention it is also possible to carry out the calibration only as needed, or before or after each measuring operation.

One advantageous further embodiment of the invention provides that the control apparatus is designed and set up for switching the measuring device between a measuring mode in which a measuring operation may be carried out, and a calibration mode in which a calibration operation may be carried out. In this regard, the switch between the measuring mode and the calibration mode may be made semiautomatically, for example by an operator, or fully automatically, for example before a test piece is machined.

One extremely advantageous further embodiment of the invention provides that the measuring head has a measuring prism having an opening angle $\alpha$ (first angle) and an axis of symmetry, that the orientation of the linear axis of the measuring sensor relative to the axis of symmetry of the measuring prism is defined by a second angle $\beta$, and that the calibration is carried out with respect to the first angle $\alpha$ and/or the second angle $\beta$. Calibration of the measuring device with respect to the first angle and/or the second angle reduces the risk of measurement inaccuracies caused by deviations of the assumed geometric relationships from the actual geometric relationships of the measuring device, since component tolerances as well as geometric deviations caused by wear may be detected by a calibration with respect to the first angle and the second angle. If a wear-related change in the opening angle of the prism is the primary focus, according to the invention it may be sufficient to carry out a calibration solely with respect to the first angle $\alpha$. On the other hand, if a change in the kinematics of the rod assembly which connects the measuring head to the base body as the result of component tolerances or wear is the primary focus, according to the invention a calibration with respect to the angle $\beta$ may be sufficient. Ideally, however, the calibration is carried out with respect to the first angle $\alpha$ and the second angle $\beta$.

Another advantageous further embodiment of the invention provides that the control apparatus has a memory in which calibration data obtained during a calibration operation are storable, whereby the memory is in, or may be brought into, data transmission connection with an evaluation apparatus for taking the calibration data into account in the evaluation of measured data obtained during a measuring operation. In these embodiments, the calibration data obtained during the calibration are stored in a memory so that they may be used in evaluating the measurement and the associated reconstruction of the component contour, in particular with regard to diameter and roundness.

Another advantageous further embodiment of the invention provides that the calibration is carried out using a roundness standard.

In this regard, the roundness standard may be modified according to the invention in such a way that a calibration may be carried out in particular with respect to the first angle $\alpha$ and the second angle $\beta$. For this purpose, one advantageous further embodiment of the invention provides that the calibration is carried out using a cylinder which in the peripheral direction has a flattened portion with a predefined extent at least one location.

A particularly simple calibration results when the calibration is carried out using a Flick standard as provided in another further embodiment of the invention. A Flick standard is composed of a cylinder having the most ideal circular contour possible and having a flattened portion with a predefined extent at a peripheral location.

Another advantageous embodiment of the invention includes measuring device for in-process measurement of test pieces during a machining operation on a machine tool that includes:
  a) a base body;
  b) a measuring head which is movable between a neutral position and a measuring position and which is connected to the base body via a rod assembly which is configured and set up in such a way that the measuring head in the measuring position follows orbital rotations of a test piece about a rotational axis;
  c) the measuring head having a measuring sensor which is deflectable along a linear axis for recording measured values during a measuring operation;
  d) a control apparatus for controlling the measuring operation;
  e) the control apparatus is configured and set up in such a way that the measuring device may be calibrated in a calibration mode.

A method according to the invention for operating a measuring device which is provided for in-process measurement of test pieces during a machining operation on a machine tool, in particular a grinding machine, is set forth in the claims. In the method according to the invention, the measuring device is placed in a calibration mode and calibrated by means of the control apparatus, resulting in the same corresponding advantages as for the measuring device according to the invention. The same also applies for the advantageous and practical further embodiments of the method according to the invention set forth in the method claims. The method according to the invention is used in particular for operating a measuring device according to one of the measuring device claims.

The invention is explained in greater detail below with reference to the appended, highly schematic drawings in which one embodiment of a measuring device according to the invention is illustrated. All features described, illustrated in the drawings, and claimed in the patent claims, alone or in any arbitrary combination, constitute the subject matter of the present invention, independently of their recapitulation in the patent claims or their back-reference, and independently of their description, or illustration in the drawings.

Relative terms such as left, right, up, and down are for convenience only and are not intended to be limiting.

Below, the invention will be described in greater detail with reference to the drawings.

DETAILED DESCRIPTION OF THE INVENTION

Figure 1:
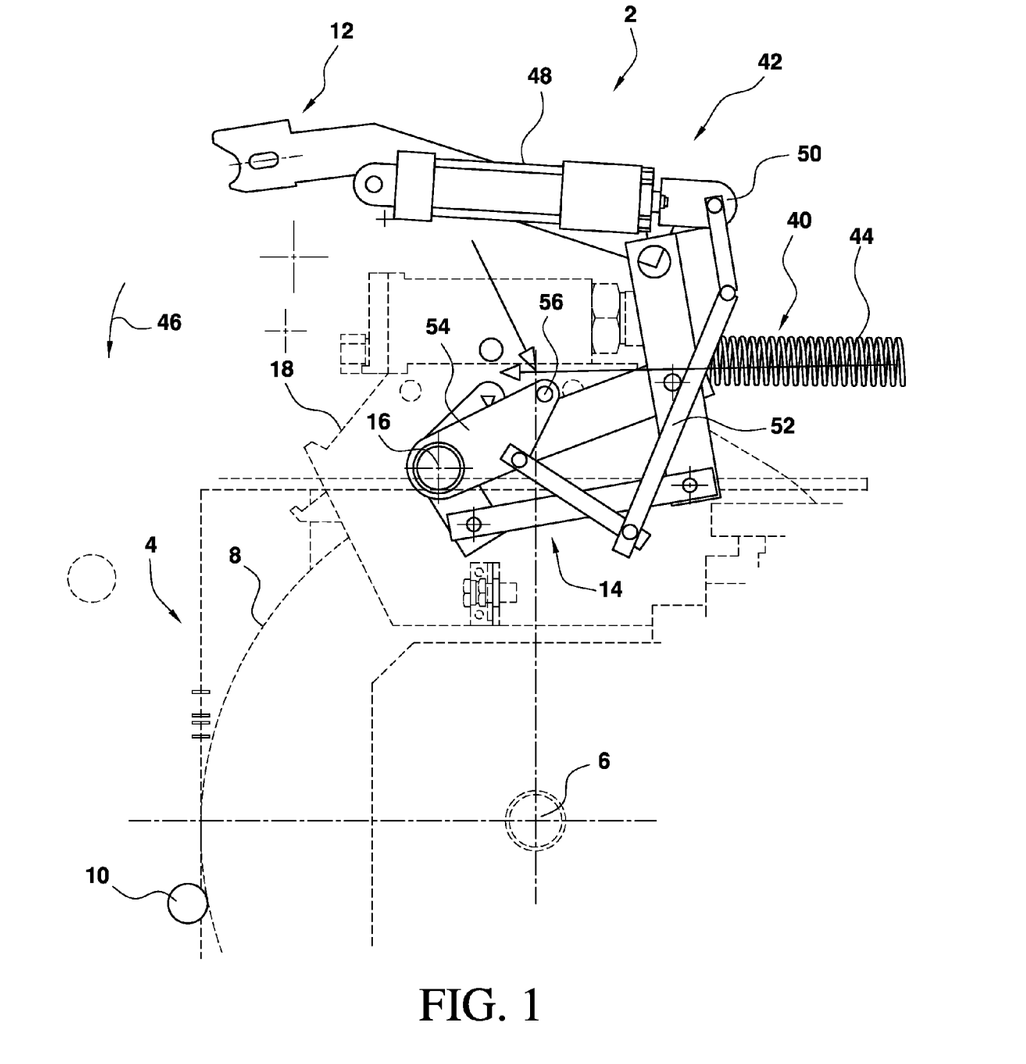
FIG. 1 shows, in a highly schematic illustration, a side view of one embodiment of a measuring device according to the invention in a neutral position of the measuring head.

FIG. 1 shows one embodiment of a measuring device 2 according to the invention which is used for in-process measurement of test pieces during a machining operation on a grinding machine 4. The grinding machine 4, which for reasons of simplification is only partially illustrated, has a grinding wheel 8 which is rotatable about a rotational axis 6 fixed to the machine, and which is used for machining a test piece, which in the present embodiment is formed by a crank pin 10 of a crankshaft.

The measuring device 2 has a measuring head 12 which is connected via a rod assembly 14 to a base body 18 of the measuring device 2 so as to be pivotable about a first pivot axis 16.

The measuring device 2 also has a means for swiveling the measuring head 12 in and out of a measuring position, as explained in greater detail below.

First, the design of the rod assembly 14 is explained in greater detail with reference to FIG. 2A. The means for swiveling the measuring head 12 in and out of the measuring position has been omitted in FIGS. 2A through 2E for reasons of clarity. The rod assembly 18 has a first rod assembly element 20 and a second rod assembly element 22 which are situated so as to be pivotable about the first pivot axis 16. A third rod assembly element 28 which is pivotable about a second pivot axis 24 is connected to the end of the second rod assembly element 22 facing away from the first pivot axis 16, the end of the third pivot axis facing away from the second pivot axis 24 being connected to a fourth rod assembly element so as to be pivotable about a third pivot axis 28, the fourth rod assembly element being connected to the first rod assembly element 20 at a distance from the third pivot axis 28 so as to be pivotable about a fourth pivot axis.

In the illustrated embodiment, the first rod assembly element 20 and the third rod assembly element 26 are not situated in parallel with one another, the distance between the first pivot axis 16 and the second pivot axis 24 being smaller than the distance between the third pivot axis 28 and the fourth pivot axis 32.

In the illustrated embodiment, the second rod assembly element 22 has a lever arm 34 such that the lever arm 34 together with the rod assembly element 22 forms a two-arm toggle lever, whose function is explained in greater detail below.

In the present embodiment, the measuring head 12 is situated on a support arm 35 which is connected to the fourth rod assembly element 30, which extends beyond the fourth pivot axis 32. In the illustrated embodiment, the connection between the support arm 34 and the fourth rod assembly element 30 is rigid. As is apparent from FIG. 2A, in the illustrated embodiment a free end of the support arm 34 which supports the measuring head 12 is bent toward the first pivot axis 16, a portion of the support arm 34 which is connected to the fourth rod assembly element 30 forming an angle of greater than 90° with the fourth rod assembly element 30.

Figure 2A:
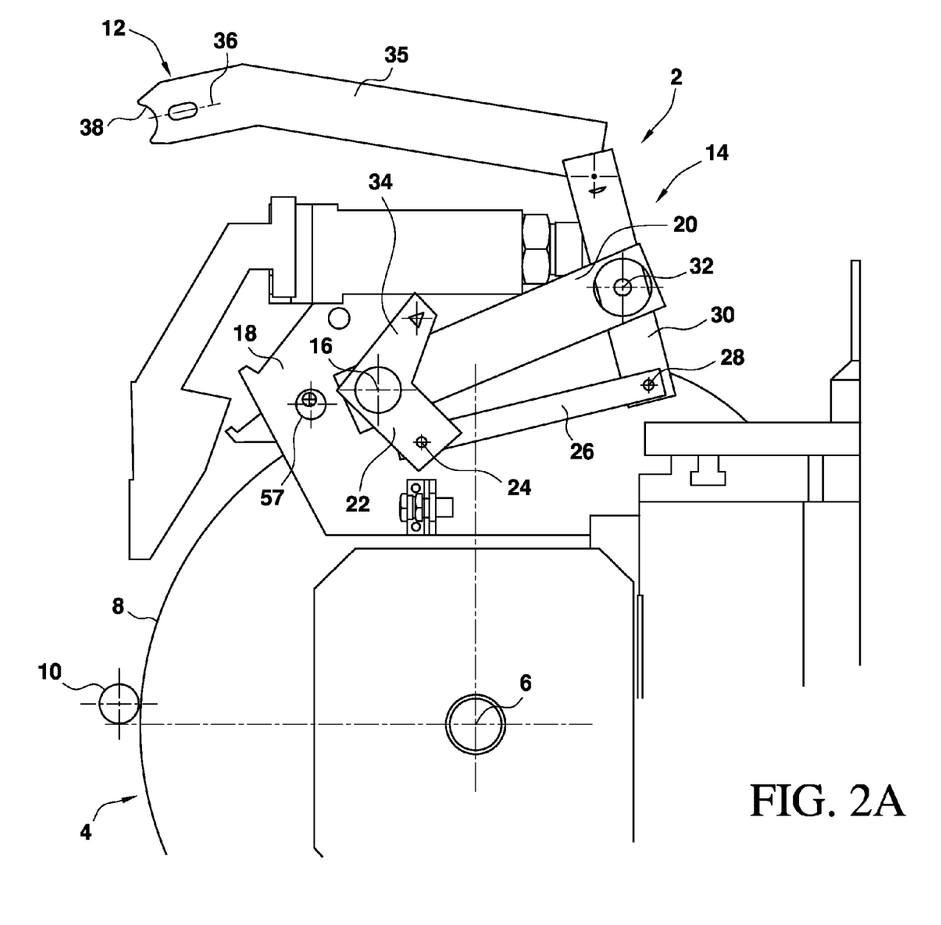
FIG. 2A shows the measuring device according to FIG. 1 in a first kinematic phase.

In the illustrated embodiment, the measuring head 12 has a measuring sensor 36, indicated by a dashed line in FIG. 2A, which is linearly deflectable along a linear axis. In the illustrated embodiment, the measuring head 12 also has a measuring prism 38. The manner in which roundness and/or dimension measurements on a test piece, in particular a crank pin of a crankshaft or some other cylindrical component, are carried out by means of an arrangement composed of a linearly deflectable measuring sensor 36 and a measuring prism 38 is generally known to those skilled in the art, and therefore is not explained in greater detail here.

The measuring device 2 also has a means for moving the measuring head 12 from a neutral position into the measuring position, and in the present embodiment has a means for swiveling the measuring head 12 in and out, and which engages on the rod assembly 14, as explained in greater detail with reference to FIG. 1. In the illustrated embodiment, the means for swiveling the measuring head 12 in and out has a swivel-in device 40 and a separate swivel-out device 42.

In the illustrated embodiment, the swivel-in device 40 has a spring means, which in the present embodiment has a spring 44 designed as a compression spring which acts on the measuring head 12 via the rod assembly 14 in a swivel-in direction symbolized by an arrow 46 in FIG. 1. In the present embodiment, the spring 44 is designed as a compression spring, and at one end is supported on the base body 18 of the measuring device 2 and on the other end is supported on the lever arm 34, so that the spring 44 acts on the lever arm 34 in FIG. 1 in the counterclockwise direction, and thus acts on the measuring head 12 in the swivel-in direction 46 by means of the rod assembly 14, and seeks to move the measuring head.

In the present embodiment, the swivel-out device 42 has a hydraulic cylinder 48 whose piston at its free end is connected to the base body 18 of the measuring device 2. A lever arrangement 42 which is designed as a toggle lever in the present embodiment is connected to the piston rod 50 of the hydraulic cylinder 48, the free end of the toggle lever which faces away from the piston rod 50 with respect to the first pivot axis 16 being eccentrically connected to a one-arm lever 54 which is supported coaxially with respect to the pivot axis 16. At its free end the lever 54 has a journal 56 which extends into the plane of the drawing and which loosely acts on the first rod assembly element 20, so that during a movement in a swivel-out direction, which in the drawing corresponds to a clockwise movement, the lever 54 functions as a carrier for the first rod assembly element 20.

For sensing the particular position of the measuring head 12, a sensor means is provided which is in operative connection with a control means for controlling the swivel-in device 40 and the swivel-out device 42.

Measured values which are recorded by means of the measuring sensor 36 during a measuring operation are evaluated by an evaluation apparatus. The manner in which such measured values are evaluated is generally known to those skilled in the art, and therefore is not explained in greater detail here.

The mode of operation of the measuring device 2 according to the invention in a measuring mode is as follows:

In the neutral position illustrated in FIG. 1 and FIG. 2A, the measuring head 12 is disengaged from the crank pin 10. In this neutral position the hydraulic cylinder 48 is stopped, so that a movement of the lever arm 34 in FIG. 1 in the counterclockwise direction, which the compression spring 44 seeks to achieve, is blocked.

For swiveling in the measuring head 12 in the swivel-in direction 46, the hydraulic cylinder 48 is actuated in such a way that its piston rod 50 is extended to the right in FIG. 1. When the piston rod 50 is extended, the spring 44 presses against the lever arm 34 so that the lever arm 34 is swiveled in the counterclockwise direction in FIG. 2. Since the lever arm 34 is connected to the second rod assembly element 22 in a rotationally fixed manner, the second rod assembly element 22, and thus the entire rod assembly 14, is swiveled in the counterclockwise direction in FIG. 2.

Figure 2B:
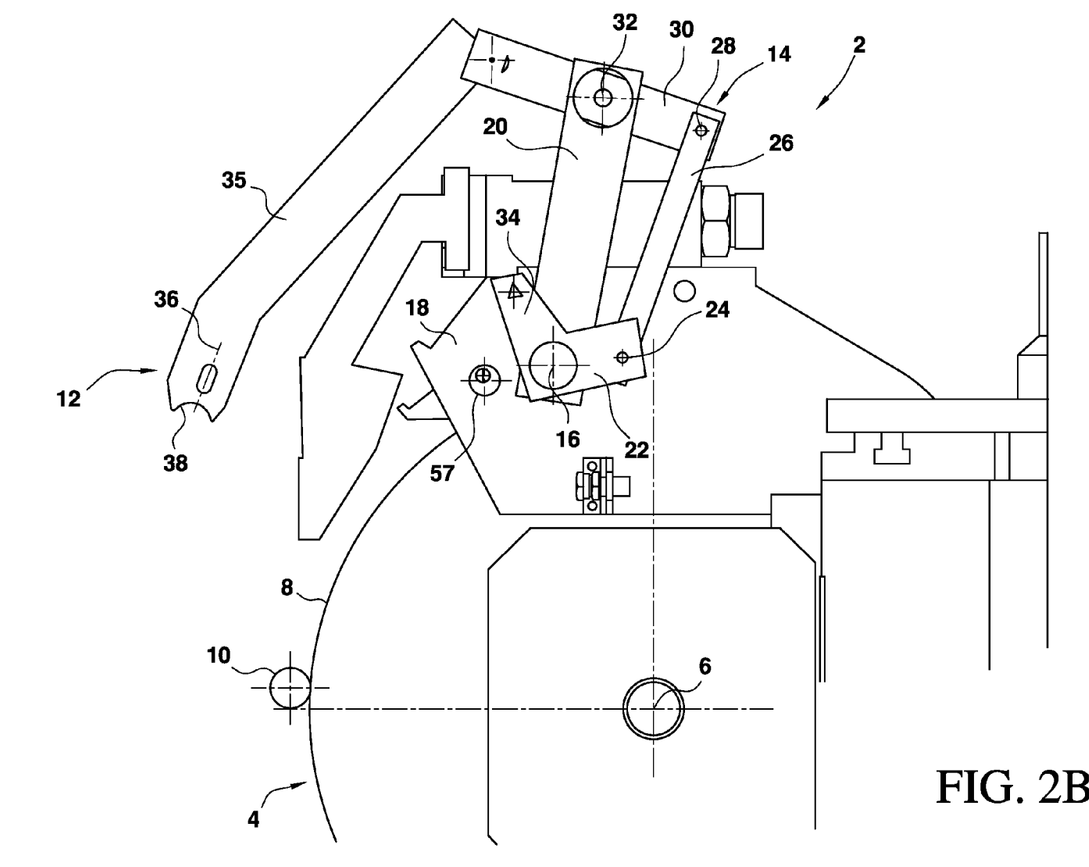
FIG. 2B shows the measuring device according to FIG. 1 in a further kinematic phase.

FIG. 2B shows the measuring head 12 in a position between the neutral position and the measuring position.

Figure 2C:
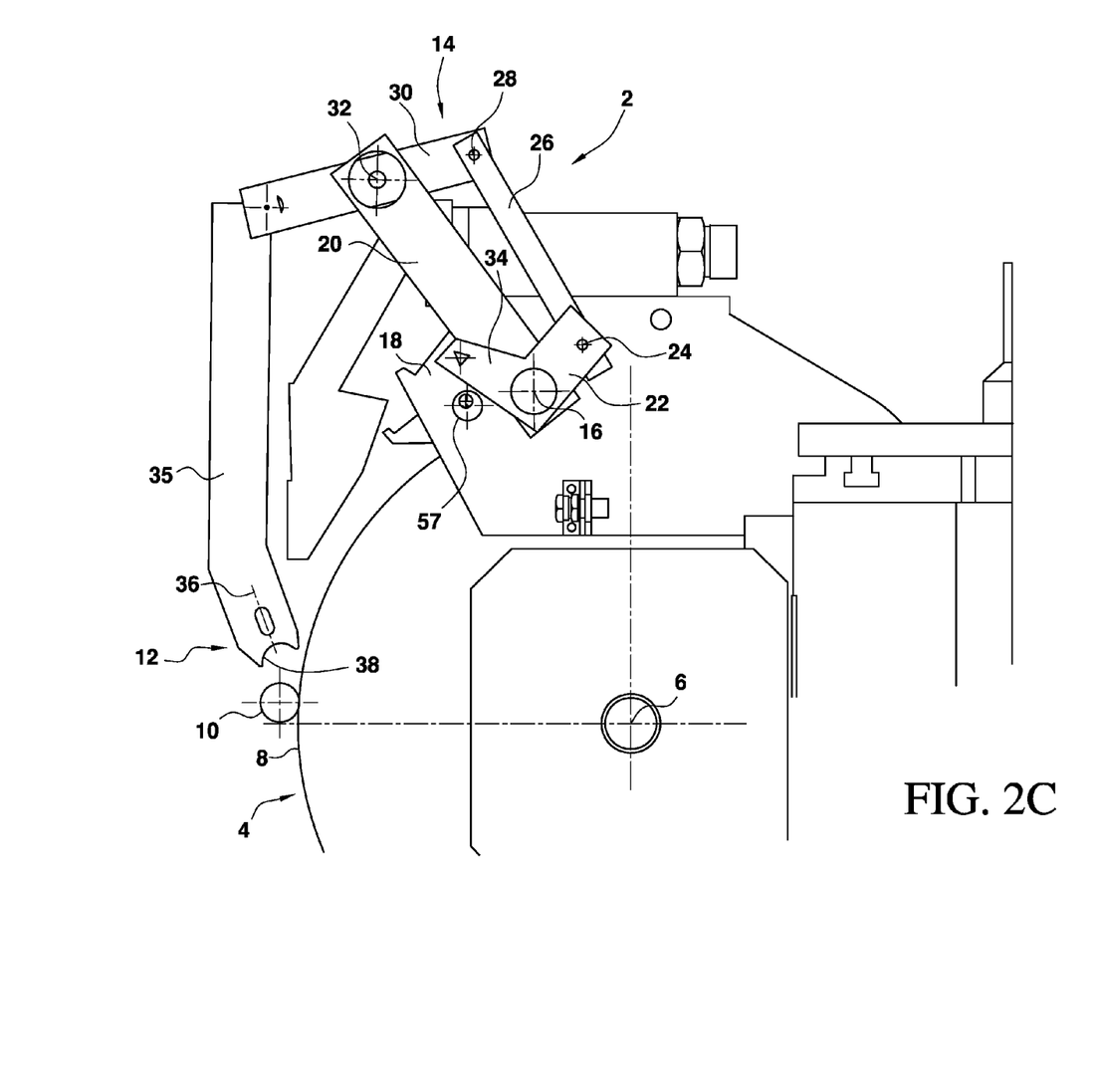
FIG. 2C shows the measuring device according to FIG. 1 in a another kinematic phase.

When a predefined angular position, illustrated in FIG. 2C, is reached, the lever arm 34 runs up against a stop 57, and when the lever arm 34 runs up against the stop 57 a control signal is transmitted to the control means, thus stopping the hydraulic cylinder 48. FIG. 2C shows the measuring head 12 in a search position in which it is not yet in contact with the crank pin 10.

Figure 2D:
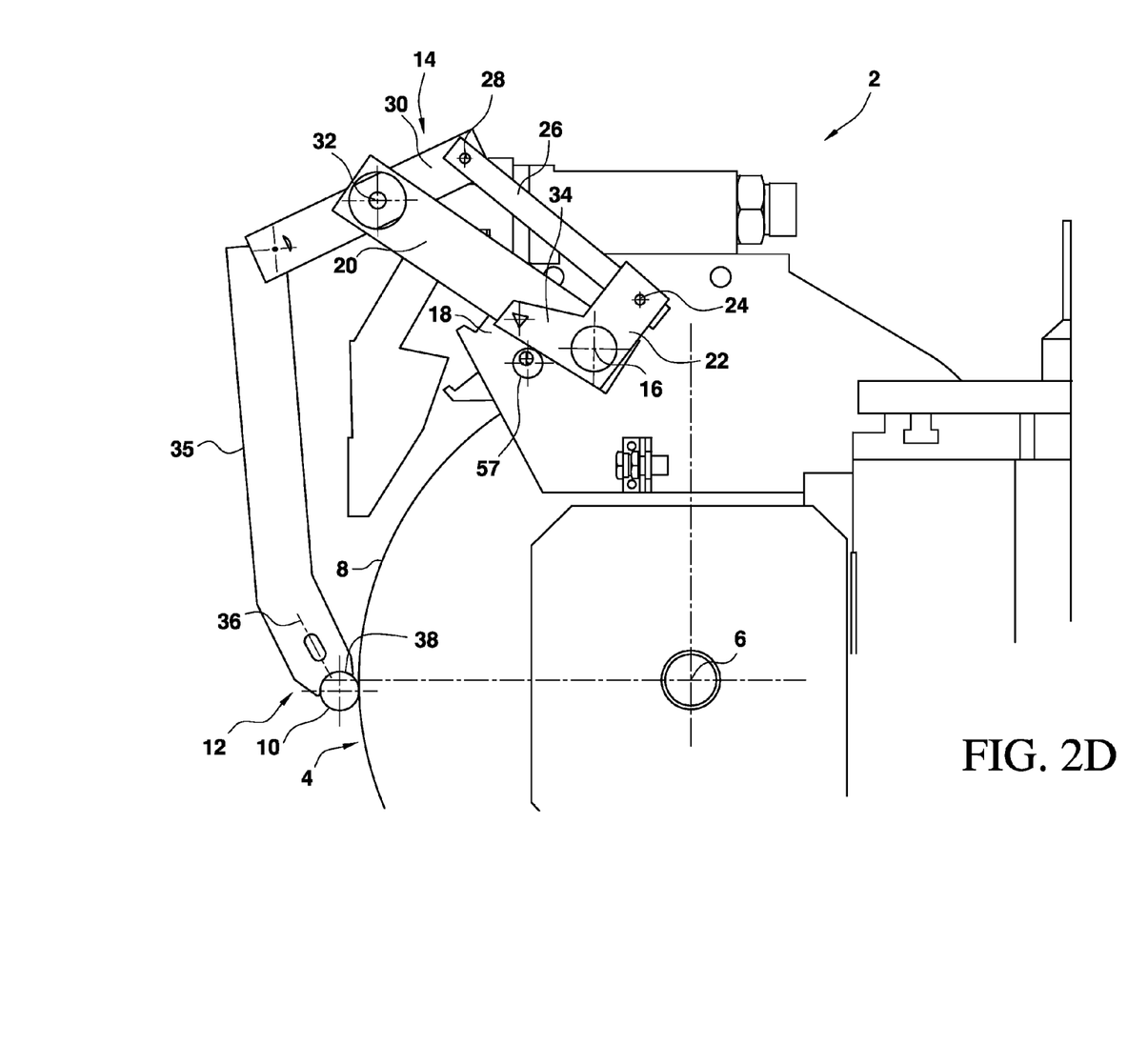
FIG. 2D shows the measuring device according to FIG. 1 in a further kinematic phase.

FIG. 2D shows the measuring head 12 in its measuring position, in which it is in contact with the crank pin 10.

Figure 2E:
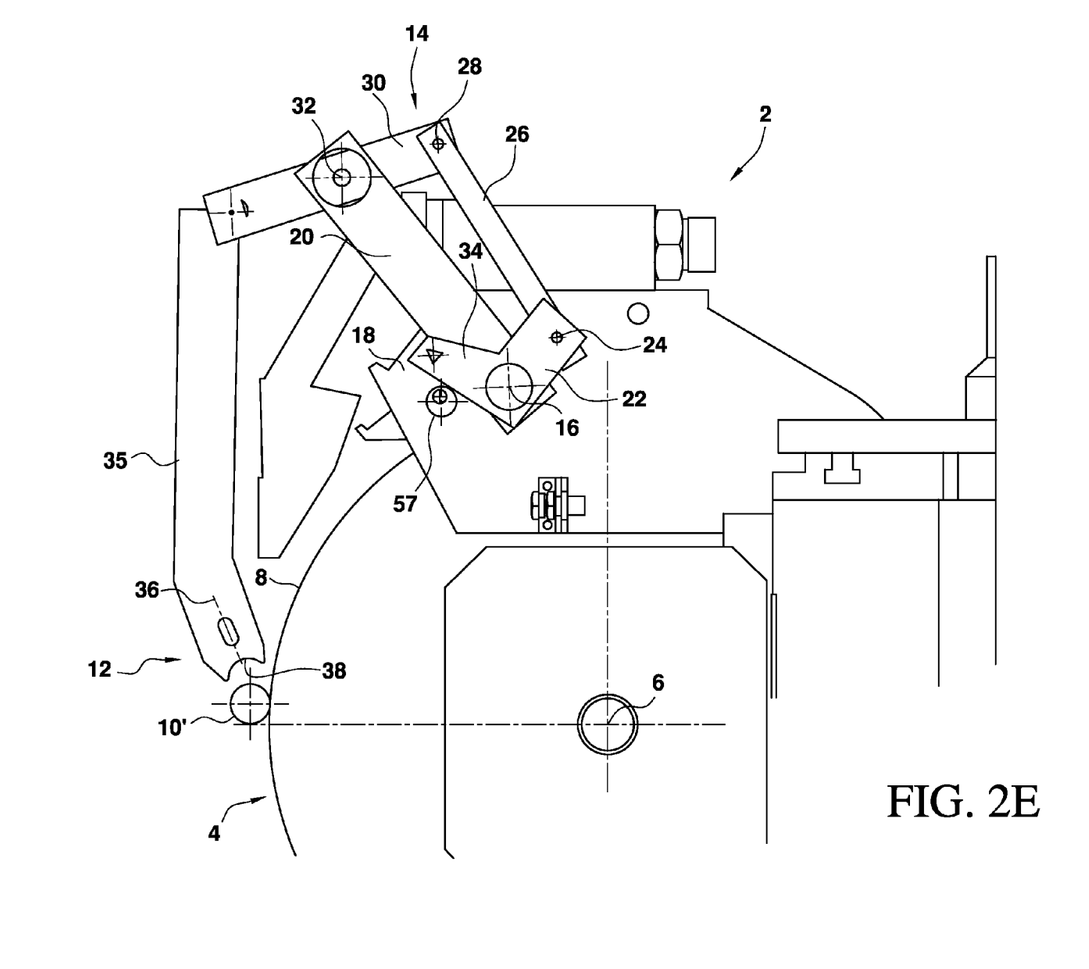
FIG. 2E shows the measuring device according to FIG. 1 in a another kinematic phase.

FIG. 2E corresponds to FIG. 2C, the measuring head 12 being illustrated in its search position with respect to a crank pin 10' having a larger diameter.

Figure 3:
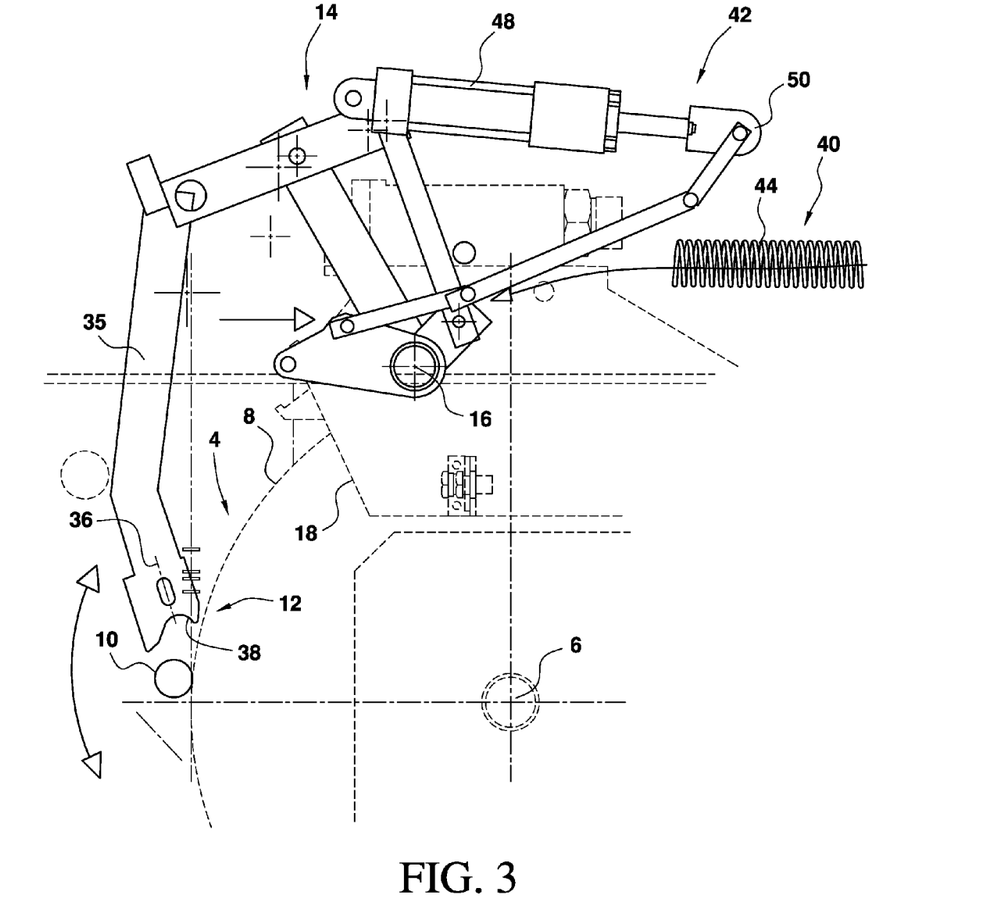
FIG. 3 shows, in the same manner as in FIG. 1, the embodiment according to FIG. 1 during the movement of the measuring head into the measuring position.

FIG. 3 shows the measuring device 2 in the search position of the measuring head 12, which is also illustrated in FIG. 2C. A comparison of FIG. 1 with FIG. 3 shows that the lever 54 is swiveled in the counterclockwise direction in FIG. 1 by means of the lever arrangement 42 while the piston rod 50 of the hydraulic cylinder 48 extends, until the angular position of the lever 54 illustrated in FIG. 3 is reached. As is apparent from FIG. 3, in this angular position the journal 56 is situated at a distance from the first rod assembly element 20 in the peripheral direction of the first rotational axis 16, so that the first rod assembly element 20, and thus the entire rod assembly 14, is able to move freely under the effect of the weight of the measuring head 12, including the support arm 34, and the compressive force exerted by the spring 44. In the measuring position (see FIG. 2D), the measuring head 12 rests against the crank pin 10, with the measuring head following orbital rotations of the crank pin 10 about the crankshaft during the grinding operation. For this purpose, the base body 18 of the measuring device 2 is nondisplaceably connected to a mounting of the grinding wheel 8, so that the measuring device 2 follows translatory movements of the grinding wheel 8 in the radial direction of the rotational axis 6.

During the contact of the measuring head 12 with the crank pin 10 the measuring sensor 36 records measured values, on the basis of which the roundness and/or the diameter of the crank pin may be assessed in the evaluation computer downstream from the measuring sensor 36. If, for example, a certain dimension of the diameter is achieved, the grinding wheel 8 is disengaged from the crank pin 10.

In order to swivel out the measuring head 12 opposite the swivel-in direction 46 after the measurement is completed, the control apparatus controls the hydraulic cylinder 48 in such a way that the piston rod 50 of the hydraulic cylinder moves to the left in FIG. 3. Thus, the lever 54 is swiveled in the clockwise direction in FIG. 3 by means of the lever arrangement 42. As long as the roller 56 is situated at a distance from the first rod assembly element 20 in the peripheral direction of the first pivot axis 16, the measuring head 12 initially remains in the measuring position. When the roller 56 comes into contact with the first rod assembly element 20 upon further swiveling of the lever 54 about the pivot axis 16 in the clockwise direction in FIG. 3, the lever 54 functions as a carrier upon further clockwise swiveling, and carries along the first rod assembly element 20 and thus the entire rod assembly 14 in the clockwise direction, so that the measuring head is swiveled out opposite the swivel-in direction 46 until the neutral position illustrated in FIG. 1 is reached.

During the measuring operation, the measuring head moves in the peripheral direction of the crank pin 10 with an angular stroke, which in the illustrated embodiment is approximately −7° and +5°, i.e., 12° overall.

The manner in which a measuring device according to the invention is operated in a calibration mode by means of a method according to the invention, and thus calibrated, is explained in greater detail below with reference to FIG. 5.

Figure 4:
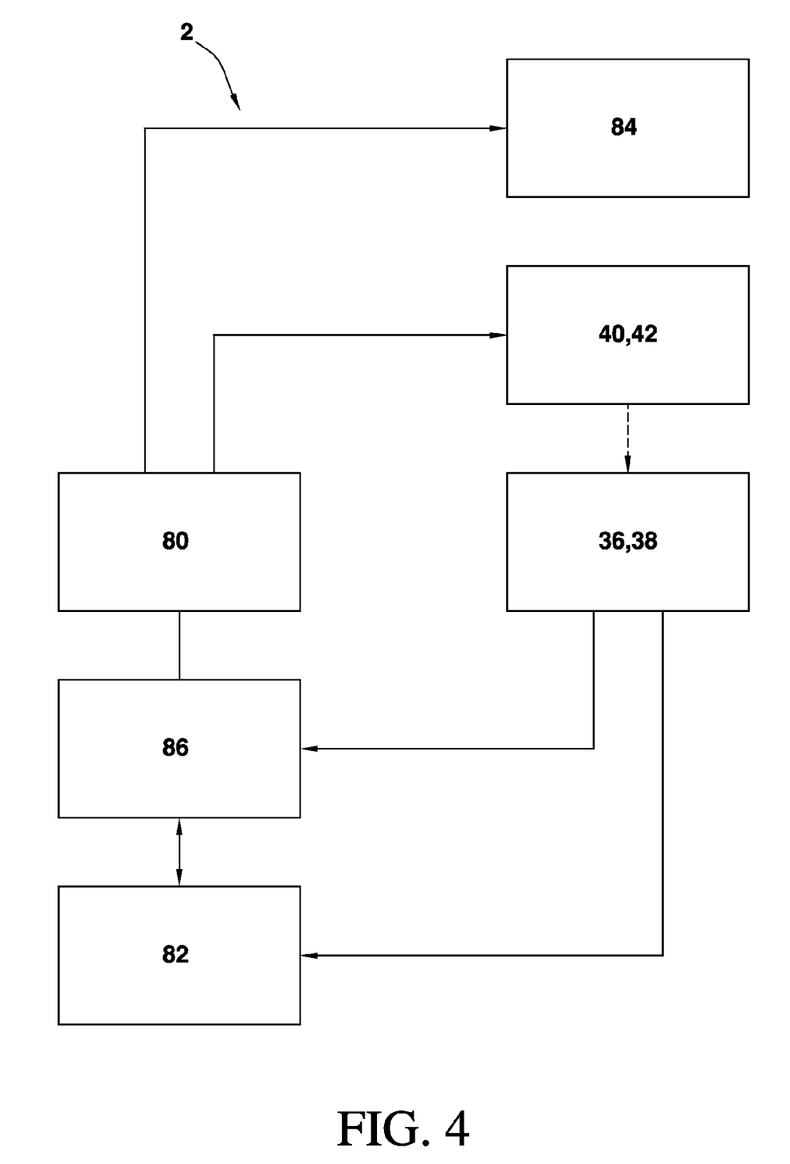
FIG. 4 shows an illustration, in the form of a block diagram, of components of the measuring device according to FIG. 1.

FIG. 4 shows, in the form of a block diagram, components of the measuring device 2 according to the invention which are used in the calibration.

The measuring device 2 according to the invention has a control apparatus 80 which is designed and set up in such a way that the measuring device 2 is switchable between a measuring mode in which a measuring operation may be carried out, and a calibration mode in which a calibration operation may be carried out. The control apparatus 80 is also designed and set up so that the measuring device may be calibrated in a calibration mode.

During a measuring operation, the measuring sensor 36 continuously records measured values which are supplied to an evaluation apparatus 82, which on the basis of the measured values reconstructs the profile of the test piece. The reconstruction may be carried out in particular by means of an iterative process according to DE 10 2009 032 353 A1. However, the reconstruction may also be carried out by means of a Fourier analysis corresponding to EP 1 263 547 B1.

In order to calibrate the measuring device 2 according to the invention, the control apparatus 80 switches the measuring device 2 from the measuring mode into the calibration mode. The calibration of the measuring device 2 is carried out in the calibration mode, in the illustrated embodiment in particular using a Flick standard as explained in greater detail below with reference to FIG. 5. In the calibration mode, initially the Flick standard is clamped in by means of a suitable clamping device with which a rotary drive 84 is associated, so that the Flick standard is rotatable relative to the measuring head 12.

In addition, the control apparatus 80 controls the swivel-in device 40 in such a way that the measuring head 12 is swiveled in and the measuring prism 38 and the measuring sensor 36 are brought into contact with the Flick standard. The control apparatus 80 subsequently controls the rotary drive 84 of the Flick standard in such a way that the Flick standard rotates relative to the measuring sensor 36.

During the rotation of the Flick standard relative to the measuring sensor 36, the measuring sensor scans the Flick standard. The measured values which are thus obtained form calibration data, on the basis of which a calibration of the measuring device is carried out in a manner explained in greater detail below. The calibration data are stored in a memory 86 of the control apparatus 80, the memory being in data transmission connection with the evaluation apparatus 82. After obtaining the calibration data, the control apparatus 82 switches the measuring device 2 back into the measuring mode. For this purpose, the swivel-out device 42 is activated, and moves the measuring head 12 from the measuring position back into the neutral position. In addition, the rotary drive 84 is stopped, so that the Flick standard is unclamped, and may be clamped in for carrying out a measuring operation on a test piece.

The calibration data which are available to the evaluation apparatus 82 are taken into account in the subsequent measuring operation for calibrating the measuring device 2. The calibration of the measuring device 2 may be carried out as needed and/or after a predetermined number of measuring operations and/or after a predetermined operating period of the measuring device 2.

The calibration is explained in greater detail below with reference to FIG. 5.

Figure 5:
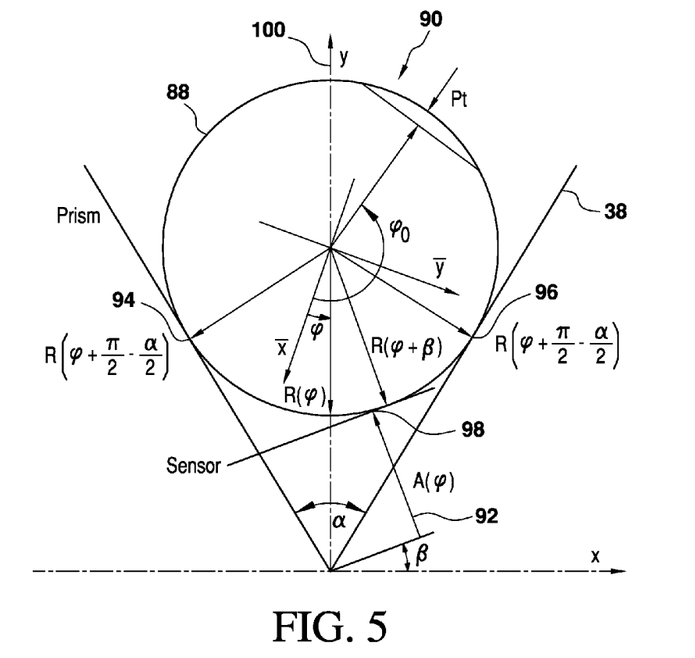
FIG. 5 shows a view of a measuring prism of the measuring device according to FIG. 1 in combination with a Flick standard for illustrating the geometric relationships.

FIG. 5 illustrates a highly schematic view of the measuring prism 38 together with a Flick standard 88.

The Flick standard 88, as is generally known to those skilled in the art, is a cylinder which is ideal with regard to its circular shape, and which has a flattened portion with a predefined extent (depth) Pt at a peripheral location 90. FIG. 5 is used for illustrating the geometric relationships that result when the measuring prism 38 rests against the Flick standard 88, the linear axis of the measuring sensor 36 being denoted by reference numeral 92 in FIG. 5.

The opening angle α (first angle) of the measuring prism 38 is apparent in FIG. 5. It is further apparent that the Flick standard 88 is in contact with the measuring prism 38 at two contact points 94, 96, while the measuring sensor 36 is in contact with the Flick standard 88 at a contact point in between, in the peripheral direction of the Flick standard 83. The axis of symmetry of the measuring prism 38 is symbolized by a dashed-dotted line 100 in FIG. 5, and forms the y axis of a right-handed Cartesian coordinate system for the following consideration. The linear axis of the measuring sensor 36 extends at an angle β (second angle) with respect to the x axis of this coordinate system. In the configuration illustrated in FIG. 5, this results in three contact points 94, 96, 98 between the Flick standard 88 and the measuring device 2.

For the following consideration, the component contour is described in the component coordinate system by the polar coordinates φ and R (φ). The measuring sensor 36 detects the distance A (φ) as a function of the rotation angle φ of the component in the measuring prism 38. Accordingly, roundness deviations result in a characteristic distance function A (φ) (deflection of the measuring sensor 36). Mathematically, this results in the following relationship between the angle-dependent component contour R (φ) and the distance function A (φ):

$$A(\varphi) = \Psi(\alpha, \beta) \cdot R\left(\varphi + \frac{\alpha - \pi}{2}\right) + \Psi(\alpha, -\beta) \cdot R\left(\varphi - \frac{\alpha - \pi}{2}\right) - R(\varphi + \beta) \quad (1.1)$$

where
α=first angle
β=second angle
φ=rotation angle of the component
R (φ)=radius of the component (component contour) as a function of the rotation angle
A (φ)=distance function In the measuring mode, the objective of the evaluation and reconstruction carried out in the evaluation apparatus 82 is to reconstruct the component contour R (φ) from the distance function A (φ) by computation. The known reconstruction methods have the common feature that the angles α and β must be known for the reconstruction. Deviations of the actual values of the angles α and β from assumed values of these angles result in measurement inaccuracies, which are avoided by the calibration carried out according to the invention.

If the Flick standard 88 has the radius $R_0$ in the areas in which its contour is circularly delimited, the smallest component radius is $R_0$–Pt, which occurs for the angle $\phi_0$. In this regard, it is a precondition that the flattened portion of the Flick standard always has only one point of contact with the measuring device 2, which, however, is easily ensured by appropriate dimensioning of the flattened portion 90.

Figure 6:
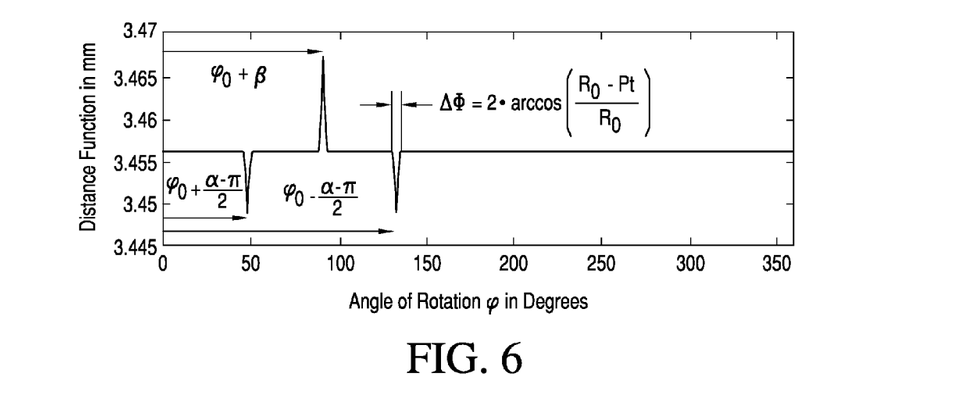
FIG. 6 shows the curve of the distance function during the calibration of the measuring device according to FIG. 1, using a Flick standard.

A rotation of the Flick standard by 360° results in the function curve illustrated in FIG. 6. The transformation rule according to equation (1.1) ensures that the peaks in FIG. 6 have the same shape, but have different amplitudes. The unknown angles may be determined, for example, by identifying the local extreme values, or by performing an integral analysis of the distance function using the Fourier transformation.

An integral analysis of the distance function using the Fourier transformation may be performed as follows:

A measurement using the Flick standard is carried out as previously described. The result of this measuring function is the distance function A (φ). On this basis, the median of the distance function may be determined, and an aperiodic function ΔA (φ) may be determined which may be mathematically reduced into three subfunctions, each subfunction describing the curve of the relative movement for one respective contact point.

The three subfunctions may then undergo a Fourier transformation. This results in three Fourier transforms of the subfunctions. On this basis, influences of the deviation in the shape ΔR (φ) and the angle $\phi_0$ with which the measurement begins may be eliminated by multiplying the Fourier transforms of the two distance functions, which describe the right-side prism contact and the left-side prism contact, by the complex conjugate Fourier transforms of the distance function which describes the contact with the probe. The result is linear phase functions whose phase terms contain only the unknown angles α and β. In the phase spectrum, the phase terms each result in a straight line which extends through the origin. The unknown straight line slopes may be computed by a "best fit" line which likewise extends through the origin. The unknown angles α and β are determined therefrom.

The actual values of the first angle α and of the second angle β thus determined may then be taken into account in the reconstruction of the component contour according to the above equation (1.1), and the measuring device 2 is thus calibrated.

Measuring errors based on a deviation of the actual geometric relationships of the measuring device 2 from assumed geometric relationships are thus reliably avoided in comparison to the prior art. Thus, the invention provides improved measuring accuracy, with a relatively low level of complexity, compared to measuring devices from the prior art.

Identical or corresponding components are provided with the same reference numerals in the figures of the drawing. FIGS. 2A through 2E show a variant of the embodiment according to FIG. 1 and FIG. 3 which is slightly modified with respect to design, which, however, corresponds to the embodiment according to FIG. 1 and FIG. 3 with regard to the base principle according to the invention.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention.

What is claimed is:

1. Measuring device for in-process measurement of test pieces during a machining operation on a machine tool comprising:
   a) a base body;
   b) a measuring head which is movable between a neutral position and a measuring position and which is connected to the base body via a rod assembly which is configured and set up in such a way that the measuring head in the measuring position follows orbital rotations of a test piece about a rotational axis;
   c) the measuring head having a measuring sensor which is deflectable along a linear axis for recording measured values during a measuring operation;
   d) a control apparatus for controlling the measuring operation;
   e) the control apparatus is configured and set up in such a way that the measuring device may be calibrated in a calibration mode;
   f) the measuring head including a measuring prism having an opening first angle and an axis of symmetry;
   g) an orientation of a linear axis of the measuring sensor relative to the axis of symmetry of the measuring prism is defined by a second angle;
   h) the calibration is carried out with respect to one of the first angle and the second angle;
   i) the control apparatus has a memory in which calibration data obtained during a calibration operation are storable;
   j) the memory is in, or may be brought into, data transmission connection with an evaluation apparatus for taking the calibration data into account in the evaluation of measured data obtained during a measuring operation; and
   k) the calibration is carried out using a cylinder which in the peripheral direction has a flattened portion with a predefined extent at at least one location.

2. Measuring device according to claim 1, wherein
   a) the control apparatus is configured and set up for switching the measuring device between a measuring mode in which a measuring operation may be carried out, and a calibration mode in which a calibration operation may be carried out.

3. Method for operating a measuring device, comprising:
   a) providing a measuring device for in-process measurement of test pieces during a machining operation on a machine tool, the measuring device having the following:
      i) a base body;
      ii) a measuring head which is movable between a neutral position and a measuring position and which is connected to the base body via a rod assembly which is configured and up in such a way that the measuring head in the measuring position follows orbital rotations of a test piece about a rotational axis;
      iii) the measuring head having a measuring sensor which is deflectable along a linear axis for recording measured values during a measuring operation;
      iv) a control apparatus for controlling the measuring operation; and
      v) the measuring device being placed in a calibration mode and calibrated by means of the control apparatus;
   b) a measuring head having a measuring prism having an opening first angle and an axis of symmetry, the orientation of the linear axis of the measuring sensor relative to the axis of symmetry of the measuring prism being defined by a second angle, the calibration being carried out with respect to one of the first angle and the second angle; and
   c) a cylinder is used in the calibration of the measuring device, and in the peripheral direction the cylinder has a flattened portion with a predefined extent at at least one location.

4. Method according to claim 3, wherein:
   a) the measuring device is switched by the control apparatus from a measuring mode in which a measuring operation is carried out, into a calibration mode in which a calibration operation is carried out.

5. Method according to claim 4, wherein:
   a) calibration data obtained during the calibration operation are stored in a memory of the control apparatus, the memory being in data transmission connection with an evaluation apparatus, and the calibration data being used in the evaluation of measured data obtained during a measuring operation.

6. Method according to claim 3, wherein:
   a) in the machining operation on a machine tool, the machine tool is a grinding machine.

7. Measuring device according to claim 1, wherein:
   a) in the machining operation on a machine tool, the machine tool is a grinding machine.

8. Measuring device for in-process measurement of test pieces during a machining operation on a machine tool comprising:
   a) a base body;
   b) a measuring head which is movable between a neutral position and a measuring position and which is connected to the base body via a rod assembly which is configured and set up in such a way that the measuring head in the measuring position follows orbital rotations of a test piece about a rotational axis;
   c) the measuring head having a measuring sensor which is deflectable along a linear axis for recording measured values during a measuring operation;
   d) a control apparatus for controlling the measuring operation;
   e) the control apparatus is configured and set up in such a way that the measuring device may be calibrated in a calibration mode;
   f) the measuring head including a measuring prism having an opening first angle and an axis of symmetry;
   g) an orientation of a linear axis of the measuring sensor relative to the axis of symmetry of the measuring prism is defined by a second angle;
   h) the calibration is carried out with respect to one of the first angle and the second angle;
   i) the control apparatus has a memory in which calibration data obtained during a calibration operation are storable;
   j) the memory is in, or may be brought into, data transmission connection with an evaluation apparatus for taking the calibration data into account in the evaluation of measured data obtained during a measuring operation; and
   k) the calibration is carried out using a Flick standard.

9. Measuring device according to claim 8, wherein:
a) the control apparatus is configured and set up for switching the measuring device between a measuring mode in which a measuring operation may be carried out, and a calibration mode in which a calibration operation may be carried out.

10. Method for operating a measuring device, comprising:
a) providing a measuring device for in-process measurement of test pieces during a machining operation on a machine tool, the measuring device having the following:
   i) a base body;
   ii) a measuring head which is movable between a neutral position and a measuring position and which is connected to the base body via a rod assembly which is configured and set up in such a way that the measuring head in the measuring position follows orbital rotations of a test piece about a rotational axis;
   iii) the measuring head having a measuring sensor which is deflectable along a linear axis for recording measured values during a measuring operation;
   iv) a control apparatus for controlling the measuring operation; and
   v) the measuring device being placed in a calibration mode and calibrated by means of the control apparatus;
b) a measuring head having a measuring prism having an opening first angle and an axis of symmetry, the orientation of the linear axis of the measuring sensor relative to the axis of symmetry of the measuring prism being defined by a second angle, the calibration being carried out with respect to one of the first angle and the second angle; and
c) a Flick standard is used in the calibration of the measuring device.

11. Method according to claim 10, wherein:
a) the measuring device is switched by the control apparatus from a measuring mode in which a measuring operation is carried out, into a calibration mode in which a calibration operation is carried out.

12. Method according to claim 10, wherein:
a) calibration data obtained during the calibration operation are stored in a memory of the control apparatus, the memory being in data transmission connection with an evaluation apparatus, and the calibration data being used in the evaluation of measured data obtained during a measuring operation.

13. Method according to claim 10, wherein:
a) in the machining operation on a machine tool, the machine tool is a grinding machine.

* * * * *